US00RE34011E

United States Patent [19]

Brandt

[11] E Patent Number: Re. 34,011

[45] Reissued Date of Patent: Jul. 28, 1992

[54] PROPELLER COMBINATION FOR A BOAT PROPELLER UNIT

[75] Inventor: Lennart H. Brandt, Fjärås, Sweden

[73] Assignee: AB Volvo Penta, Gotebora, Sweden

[21] Appl. No.: 517,615

[22] Filed: May 2, 1990

Related U.S. Patent Documents

Reissue of:

[64] Patent No.: 4,741,670
Issued: May 3, 1988
Appl. No.: 907,214
Filed: Sep. 12, 1986

[51] Int. Cl.[5] ..... B63H 1/18

[52] U.S. Cl. ..... 416/129; 416/175; 416/242

[58] Field of Search ..... 416/129, 120, 124, 125, 416/128, 175 R, 203, 242

[56] References Cited

U.S. PATENT DOCUMENTS

| | | | |
|---|---|---|---|
| 1,088,080 | 2/1914 | Leavitt | 416/129 A |
| 1,853,694 | 4/1932 | Melcher | 416/129 A |
| 2,672,115 | 3/1954 | Conover | 416/129 A |
| 3,109,495 | 11/1963 | Lang | 416/129 A |
| 3,514,215 | 5/1970 | Williams | 416/203 |
| 3,537,419 | 11/1970 | Holtermann et al. | 115/34 |
| 3,688,732 | 9/1972 | Singelmann et al. | 115/37 |
| 3,697,193 | 10/1972 | Phillips | 416/242 |
| 3,765,370 | 10/1973 | Shimanckas | 115/35 |
| 3,769,930 | 11/1973 | Pinkerton | 115/35 |
| 3,817,202 | 6/1974 | Holtermann | 115/34 |
| 4,052,952 | 10/1977 | Hale et al. | 115/41 |
| 4,073,601 | 2/1978 | Kress | 416/242 |
| 4,074,652 | 2/1978 | Jackson | 115/35 |
| 4,178,873 | 12/1979 | Bankstahl | 115/73 |
| 4,297,097 | 10/1981 | Kickhaefer | 440/59 |
| 4,352,666 | 10/1982 | McGowan | 440/53 |
| 4,529,387 | 7/1985 | Brandt | 416/129 A |
| 4,552,511 | 11/1985 | Sumigawa | 416/242 |
| 4,619,584 | 10/1986 | Brandt | 416/129 A |
| 4,642,059 | 2/1987 | Nohara | 416/129 A |
| 4,698,036 | 10/1987 | Brandt | 416/129 A |

FOREIGN PATENT DOCUMENTS

| | | | |
|---|---|---|---|
| 302859 | 1/1918 | Fed. Rep. of Germany | 416/242 |
| 908253 | 4/1946 | France | 416/128 |
| 369864 | 4/1939 | Italy | 416/128 |
| 130195 | 3/1981 | Japan | 416/129 A |
| 183382 | 10/1983 | Japan | 416/129 A |
| 96092 | 6/1984 | Japan | 416/129 A |
| 433599 | 6/1984 | Sweden . | |
| 435364 | 9/1984 | Sweden . | |
| 323677 | 1/1930 | United Kingdom . | |
| 314968 | 5/1930 | United Kingdom . | |
| 857394 | 12/1960 | United Kingdom . | |
| 886169 | 1/1962 | United Kingdom . | |
| 1203560 | 8/1970 | United Kingdom . | |
| 1216291 | 12/1970 | United Kingdom . | |
| 1324799 | 7/1973 | United Kingdom . | |
| 1514298 | 6/1978 | United Kingdom . | |
| 2094894 | 9/1982 | United Kingdom | 416/129 A |

OTHER PUBLICATIONS

"Systematic Studies of Contra-Rotating Propellers for Merchant Ships," Eric Bjarne, *Proceedings: International Marine and Shipping Conference* organized by the Institute of Marine Engineers and held in London, Jun. 4-8, 1973.

*Primary Examiner*—John T. Kwon
*Attorney, Agent, or Firm*—Kenyon & Kenyon

[57] ABSTRACT

The invention relates to a boat propeller unit with double, counter-rotating propellers. The forward propeller is designed to function without cavitation, while the after-propeller is optimally cavitating by being made cupped and with a blade width of between 60% and 75% of the blade width of the forward propeller.

27 Claims, 3 Drawing Sheets

PROPELLER COMBINATION FOR A BOAT PROPELLER UNIT

Matter enclosed in heavy brackets [ ] appears in the original patent but forms no part of this reissue specification; matter printed in italics indicates the additions made by reissue.

The present invention relates to a propeller combination for a boat propeller unit, comprising a forward propeller and an after-propeller intended to rotate in opposite directions about a common rotational axis.

Such a propeller combination is shown in U.S. Pat. No. 4,619,584, in which both the propellers are designed for optimum cavitation-free operation. This gives the propellers a "firm-grip" in the water which is an advantage for heavy boats, since the manoeuverability will be quite good and it provides good control of the boat's movement in the water.

If, however, the engine power is increased at the same time as a lighter boat is used for higher speeds, the effect of the propeller grip in the water affects the behaviour of the boat during sudden turns with extreme rotation of the steering wheel. For example for a fast boat (35–45 knots) with a deep V-bottom, the long, deep V will track the boat even in turns. If the steering wheel is turned sharply, the boat can be forced into such a sharp turn that the V will suddenly lose its grip and the after-portion skid. At precisely this moment when the skidding occurs, there arises a counter-acting force on the propeller transversely to the propeller in its plane of rotation. The water strives to counter-act the subsequent displacement of the propeller, the counter-acting forces being proportional both to the pull of the propeller and its displacement speed.

The suddenly arising (and short-lived) force makes the propeller "stick" in the water for an instant, and if the boat speed is quite high and one makes a hard, rapid turn of the wheel there is the risk that the boat will make a short outwardly directed tipping movement, which can be unexpected for those in the boat. This sudden phenomenon is not particularly connected with double propeller units but applied generally to non-cavitating propellers.

The purpose of the present invention is to achieve a propeller combination of the type described by way of introduction, by means of which it is possible to appreciably reduce the propeller transverse forces which can arise when skidding (especially in boats with a deep V-bottom) not only to increase safety but also to provide a softer, more comfortable movement when turning.

This is achieved according to the invention by the forward propeller being designed to function without cavitation, while the after-propeller is designed to function with optimum or partial cavitation, has cupped blades and a total blade area of between ⅛ and ⅜ of the total bade area of the forward propeller.

The following general principles apply to cavitation:

A propeller blade cuts through the water with a speed which is a combination of the boat speed and the rotational speed of the blade. At the representation radius of 70%, the velocity is normally 60–70 knots. The velocity is high and the blade must therefore be thin and long, so that the water will have time to fill up the cavity which tends to form when the blade cuts through the water. At 60 knots for example, the blade may have a thickness of at most 8% of the blade width and at 70 knots at most 6%.

In addition to the blade thickness, the water is affected by a pressure difference over the blades, corresponding to the pulling force of the propeller. This creates a suction side and a pressure side, to which pressure the effect of the blade thickness is added. The required blade area per kW of engine power can be calculated by known methods for a propeller which is to work optimally without cavitating. For the propeller drive unit described in U.S. Pat. No. 4,619,584 the target value is about 10 $cm^2$ per kW.

By dimensioning the after-propeller in accordance with the invention with "too little" area, a cavitating propeller is obtained. In order to make it practical to have such a propeller, it is essential, however, that the bubble not collapse on the blade. In accordance with an additional feature of the invention, the after-propeller is cupped, i.e. the blade is provided with a sharp curvature at the rear edge and this produces a pressure fluid which has a tendency to provide a low pressure which becomes lower from the nose to the rear edge. The result is that the cavitation bubble begins at or near the rear edge. It is also small.

The invention provides a propeller combination with an after-propeller, the efficiency of which is somewhat lower than for a conventional propeller, but which, on the other hand, makes it possible to reduce the steering forces by up to 50%.

The invention will be described below with reference to examples shown in the accompanying drawings.

Figure 1:
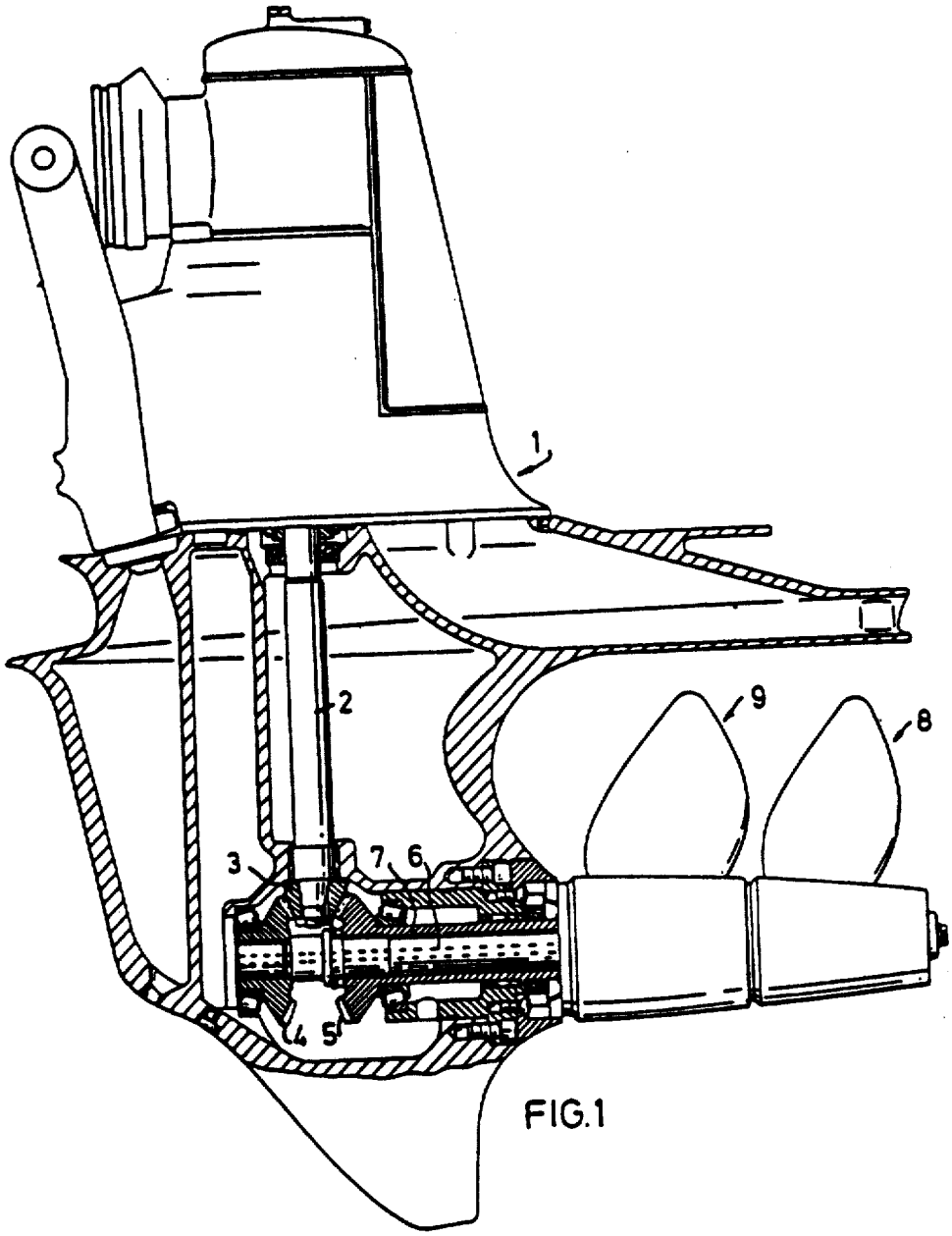
FIG. 1 shows in partial section a side view of a propeller combination according to the invention.

The propeller drive unit generally designated 1 in FIG. 1 is a so-called inboard/outboard drive unit, designed to be mounted on a boat transom and be coupled to the output shaft of an engine (not shown). The drive unit contains a reversing mechanism, with an output shaft 2 having a conical gear 3 in constant engagement with two conical gears 4 and 5. Gear 4 drives one propeller shaft 6 and gear 5 drives a hollow shaft 7 journalled concentrically to shaft 6. Shaft 6 carries propeller 8 and shaft 7 carries propeller 9. This arrangement makes the propeller shafts rotate in opposite directions.

Figure 2:
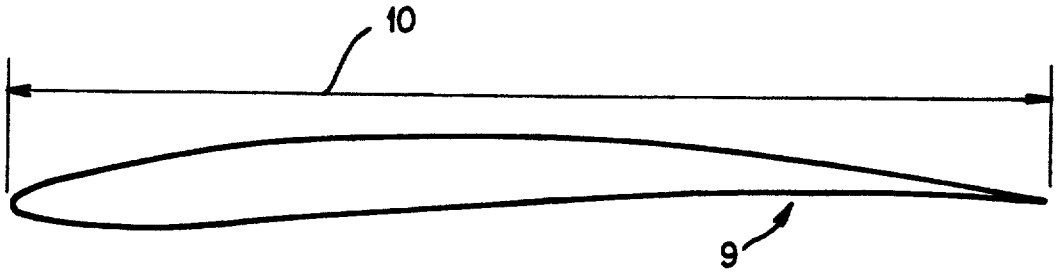
FIG. 2 shows a cross section through a forward propeller blade.
Figure 3:
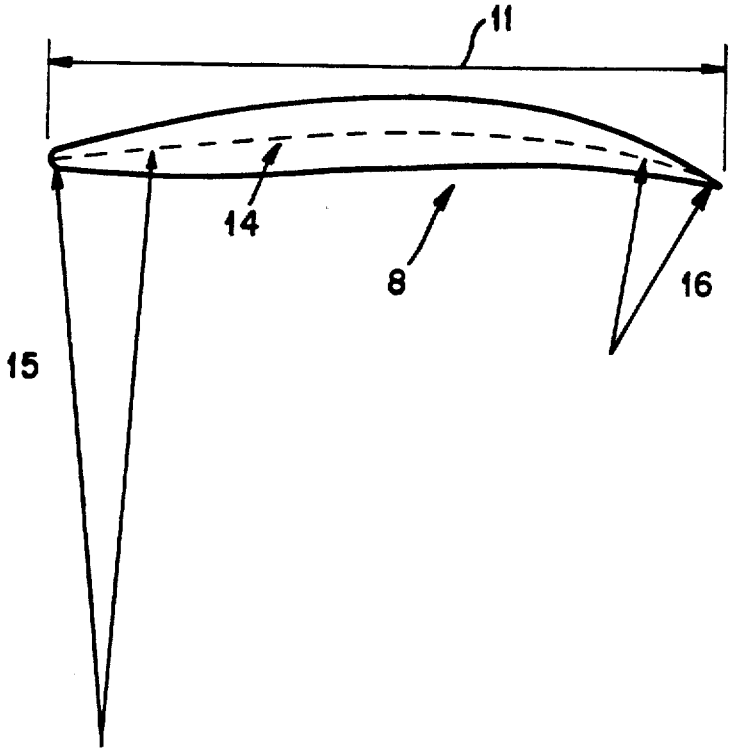
FIG. 3 shows a cross section through an after-propeller blade.

The forward propeller 9 shown in section in FIG. 2 is shaped so that the propeller will function without cavitation, while the after-propeller shown in section in FIG. 3 is shaped so that the propeller will have an optimum cavitation (semi-cavitating), the cavitation bubble extending from the rear edge of the propeller blade and not from its front edge. For this purpose the propeller 8 is made with a section, the [chord] *width* of which in the example shown is reduced by about 30% in relation to the forward propeller [8] *9*. In order to provide optimum cavitation for the after-propeller the total blade area must be between ⅛ and ⅜ of the total blade area of the forward propeller.

As shown in FIG. 3, the blades of the after-propeller are cupped and have their maximum curvature in [the rear half of the chord] *their rear half*. The radius of curvature *15* for the arch line *14* at the forward edge (the forward 10% of the [chord] *blade*) is at least three times as long as [that] *the radius of curvature 16* at the rear edge (the rear 10% of the [chord] *blade*). The thickness is increased about 14% in relation to the forward propeller so as not to reduce the strength of the blade due to the reduced blade width.

Figure 4:
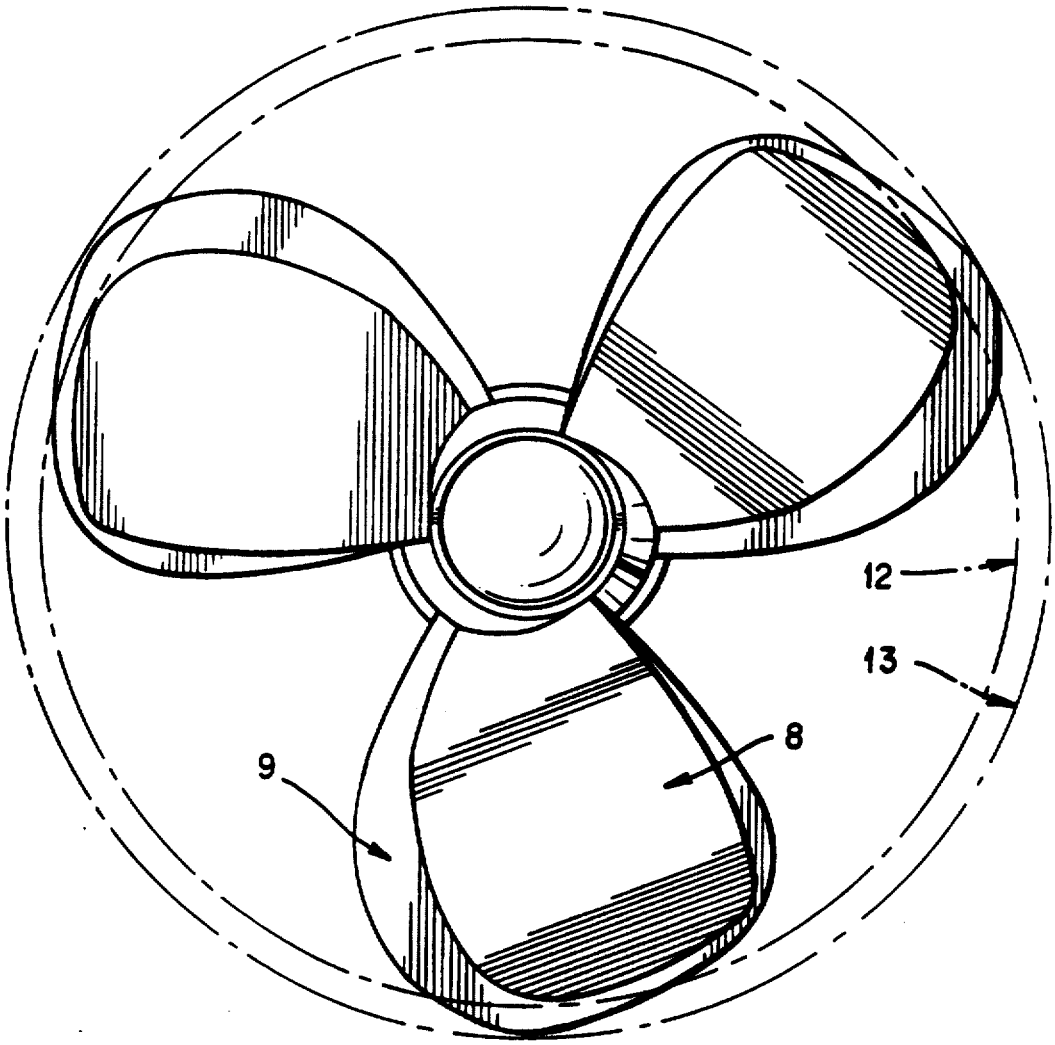
*FIG. 4 shows a rear elevation of the forward and after propellers.*

Tests and analyses have demonstrated that the forward propeller 9 should have three blades (possibly four blades) and be non-cavitating (i.e. have conventional shape) and that the after-propeller 8 in order to cavitate optimally should have a blade width *11* of between 60% and 75% of the width *10* of the forward propeller and preferably have the same number of blades as the forward propeller. [The] *As shown in FIG. 4, the* optimum diameter *12 of the after propeller* will then be 4–6% less *than diameter 13 of the forward propeller* due to the blade shape, and an additional 5–10% less due to the increased flow-through speed caused by the forward propeller. This agrees exactly with the diameter desired in order to lie just within the flow tube from the forward propeller. One blade less would tend to result in a propeller with too large a diameter. When using an after-propeller with one blade more, i.e. a four-bladed propeller, the diameter of the after-propeller should be between 75% and 95% of the diameter of the forward propeller and its pitch ratio (pitch/diameter) should be between 1.1 and 1.3 times that of the forward propeller.

I claim:

1. Propeller combination for a boat propeller unit comprising a forward propeller and an after-propeller that rotate in opposite directions about a common rotational axis, characterized in that the forward propeller is so shaped as to function without cavitating while the after-propeller is so shaped as to function with optimum cavitation and has cupped blades and a total blade area of between $\frac{1}{3}$ and $\frac{2}{3}$ of the total blade area of the forward propeller, the blades of the after-propeller having as mean camber line whose maximum curvature is in its rear half, the blade width of the after-propeller being between 60% and 75% of the blade width of the forward propeller and the propellers having the same number of blades.

2. Propeller combination as claimed in claim 1, in which the radius of curvature of the mean camber line at the front portion of the blades of the after-propeller is at least three times longer than at the rear portion of the blades of the after-propeller.

*3. A propeller combination for a steerable boat propeller unit comprising a forward propeller and an after propeller intended to rotate in opposite directions about a common rotational axis, the forward propeller having a predetermined number of blades and a total blade area, and being shaped so as to function without cavitating and the after propeller having a predetermined number of blades, and being shaped so as to function with at least partial cavitation, the after propeller having a total blade area of between $\frac{1}{3}$ and $\frac{2}{3}$ of the total blade area of the forward propeller.*

*4. A propeller combination according to claim 3, wherein the blades of the after propeller have a predetermined chord and wherein the maximum curvature of the blades is in the rear half of the cord.*

*5. A propeller combination according to claim 3, in which the after propeller has a mean camber line and the radius of curvature for the mean camber line at the front portion of the blades of the after propeller is at least three times longer than that at the rear portion of the blades of the after propeller.*

*6. A propeller combination according to claim 3, in which the blade width of the after propeller is between 60% and 75% of the blade width of the forward propeller.*

*7. A propeller combination according to claim 3, in which the propellers have the same number of blades.*

*8. A propeller combination according to claim 3, in which the after propeller has one more blade than the forward propeller.*

*9. A propeller combination according to claim 8, in which the diameter of the after propeller is between 75% and 95% of the diameter of the forward propeller.*

*10. The propeller combination of claim 3, wherein the blades of the after propeller are cupped.*

*11. A steerable propeller drive unit comprising: an output shaft; a first conical gear secured to the output shaft; a second conical gear in constant engagement with the first conical gear such that the first conical gear drives the second conical gear in a first direction; a propeller shaft secured to and driven by the second conical gear; a third conical gear in constant engagement with the first conical gear such that the conical gear drives the third conical gear in a second direction which is opposite the first direction; a hollow propeller shaft secured to and driven by the third conical gear, the hollow propeller shaft being journaled concentrically to the propeller shaft; a forward propeller secured to one of the propeller shaft and the hollow propeller shaft; an after propeller secured to the other of the propeller shaft and the hollow propeller shaft such that the forward and after propellers rotate in opposite directions; the forward propeller having a predetermined number of blades, each blade having a predetermined width and a predetermined maximum thickness, the predetermined maximum thickness being no more than 0.08 times the predetermined blade width and the blade being shaped so that the forward propeller functions without cavitating; the after propeller having a predetermined number of blades, each blade having a predetermined width, the predetermined width of the after propeller being less than or equal to 0.70 times the predetermined width of the forward propeller and the after propeller being shaped for at least partial cavitation.*

*12. The steerable propeller drive unit of claim 11, wherein the blades of the after propeller are cupped.*

*13. A steerable propeller drive unit comprising:*

*an output shaft;*

*a first conical gear secured to the output shaft;*

*a second conical gear in constant engagement with the first conical gear such that the first conical gear drives the second conical gear in a first direction;*

*a propeller shaft secured to and driven by the second conical gear;*

*a third conical gear in constant engagement with the first conical gear such that the first conical gear drives the third conical gear in a second direction which is opposite the first direction;*

*a hollow propeller shaft secured to and driven by the third conical gear, the hollow propeller shaft being journaled concentrically to the propeller shaft;*

*a forward propeller secured to one of the propeller shaft and the hollow propeller shaft, the forward propeller having a predetermined number of blades, each blade having a predetermined width and a predetermined maximum thickness, the forward propeller being shaped so as to function without cavitating; and*

*an after propeller secured to the other of the propeller shaft and the hollow propeller shaft such that the forward and after propellers rotate in opposite directions, the after propeller having a predetermined num-*

*ber of blades, each blade having a predetermined width, each of the blades having a mean camber line whose maximum curvature is in its rear half such that the radius of curvature of the mean camber line at the front portion of the blade is at least three times longer than at the rear portion of the blades and the blades being shaped so as to function with at least partial cavitation.*

*14. The propeller drive unit of claim 13 in which the forward propeller has a total blade area and the after propeller has a total blade area and wherein the total after propeller blade area is between ⅛ and ⅜ of the total blade area of the forward propeller.*

*15. The propeller drive unit of claim 13 in which the forward propeller and the after propeller have the same number of blades and the predetermined width of the blades of the after propeller is between 60% and 75% of the predetermined width of the blades of the forward propeller.*

*16. The propeller drive unit of claim 13 in which the after propeller has one more blade than the forward propeller and the diameter of the after propeller is between 75% and 95% of the diameter of the forward propeller.*

*17. The propeller drive unit of claim 13 wherein the predetermined maximum thickness of each of the blades of the forward propeller is less than or equal to 0.08 times the blade width of the blades of the forward propeller.*

*18. The propeller drive unit of claim 13 in which the width of the after propeller is no more than 0.70 times the width of the forward propeller.*

*19. The propeller drive unit of claim 13 wherein the blades of the after propeller are cupped.*

*20. A steerable propeller drive unit comprising first and second propeller shafts intended to rotate in opposite directions about a common rotational axis, a forward propeller secured to the first shaft for rotation therewith and an after propeller secured to the second propeller shaft for rotation therewith, the forward propeller having a predetermined number of blades and a total blade area, and being shaped so as to function without cavitating and the after propeller having a number of blades, and being shaped so as to function with at least partial cavitation, the after propeller having a total blade area of between ⅛ and ⅜ of the total blade area of the forward propeller.*

*21. A propeller combination according to claim 20, wherein the blades of the after propeller have a predetermined width and wherein the maximum curvature of the blades is in the rear half of the width.*

*22. A propeller combination according to claim 20, in which the after propeller has a mean camber line and the radius of curvature for the mean camber line at the front portion of the blades of the after propeller is at least three times longer than that at the rear portion of the blades of the after propeller.*

*23. A propeller combination according to claim 20, in which the blade width of the after propeller is between 60% and 75% of the blade width of the forward propeller.*

*24. A propeller combination according to claim 20, in which the propellers have the same number of blades.*

*25. A propeller combination according to claim 20, in which the after propeller has one more blade than the forward propeller.*

*26. A propeller combination according to claim 25, in which the diameter of the after propeller is between 75% and 95% of the diameter of the forward propeller.*

*27. The propeller combination of claim 20 wherein the blades of the after propeller are cupped.*

* * * * *